United States Patent
Orange et al.

(10) Patent No.: US 10,723,879 B2
(45) Date of Patent: Jul. 28, 2020

(54) POLYAMIDE MIXTURE HAVING IMPROVED FLUIDITY

(71) Applicant: RHODIA OPERATIONS, Paris (FR)

(72) Inventors: Gilles Orange, Vourles (FR); Christiane Prebet, Taluyers (FR); Didier Tupinier, Assieu (FR); Stéphane Jeol, Cumming, GA (US)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 15/535,536

(22) PCT Filed: Dec. 21, 2015

(86) PCT No.: PCT/EP2015/080856
§ 371 (c)(1),
(2) Date: Jun. 13, 2017

(87) PCT Pub. No.: WO2016/102507
PCT Pub. Date: Jun. 30, 2016

(65) Prior Publication Data
US 2017/0342268 A1  Nov. 30, 2017

(30) Foreign Application Priority Data
Dec. 22, 2014 (FR) ..................... 14 63110

(51) Int. Cl.
*C08L 77/06* (2006.01)
*C08J 5/04* (2006.01)

(52) U.S. Cl.
CPC .............. *C08L 77/06* (2013.01); *C08J 5/043* (2013.01); *C08J 2377/06* (2013.01); *C08J 2477/06* (2013.01); *C08L 2205/025* (2013.01)

(58) Field of Classification Search
CPC ..................................................... C08L 77/06
See application file for complete search history.

(56) References Cited

U.S. PATENT DOCUMENTS

| 2009/0131569 A1 | 5/2009 | Schwitter |
| 2010/0215920 A1 | 8/2010 | Orange et al. |
| 2011/0224370 A1* | 9/2011 | Kanda ............ C08G 69/26 524/606 |
| 2011/0241249 A1* | 10/2011 | Orange ............ B29C 70/465 264/257 |
| 2012/0190785 A1 | 7/2012 | Ban et al. |
| 2013/0062806 A1* | 3/2013 | Mitadera ............ C08J 5/24 264/129 |

FOREIGN PATENT DOCUMENTS

| JP | H06220320 A | 8/1994 |
| JP | 2008540779 A | 11/2008 |
| JP | 2014111758 A | 6/2014 |
| WO | 2011073200 A1 | 6/2011 |
| WO | 2013187220 A1 | 12/2013 |

* cited by examiner

Primary Examiner — Michael F Pepitone
(74) Attorney, Agent, or Firm — Thi Dang

(57) ABSTRACT

The invention relates to a thermoplastic composition having improved fluidity in the molten state, comprising at least:
(a) a polyamide that has a melt viscosity greater than or equal to 50 Pa·s, and
(b) a non-evolutive polyamide having a melt viscosity lower than the melt viscosity of said polyamide (a), above 0.8 Pa·s, and having a number-average molecular weight Mn lower than that of said polyamide (a),
said composition having a melt viscosity that is stabilized at a value below the melt viscosity of said polyamide (a),
said polyamide (b) having:
a concentration of amine end groups (AEG) and/or of carboxyl end groups (CEG) less than or equal to 20 meq/kg, or
a concentration of amine end groups (AEG) greater than or equal to 25 meq/kg; a concentration of acid end groups (CEG) greater than or equal to 25 meq/kg; and a concentration of blocked end groups (BEG) greater than or equal to 25 meq/kg.

14 Claims, No Drawings

POLYAMIDE MIXTURE HAVING IMPROVED FLUIDITY

CROSS-REFERENCE TO RELATED APPLICATIONS

The present application is a U.S. national phase entry under 35 U.S.C. § 371 of International Application No. PCT/EP2015/080856, filed on 21 Dec. 2015, which claims priority to French Application No. 1463110, filed on 22 Dec. 2014. The entire content of each of these applications is explicitly incorporated herein by reference.

The present invention relates to the field of thermoplastic polymers, in particular polyamides, notably useful for preparing composite materials, produced by impregnating a fabric (reinforcing material) with these polyamides in the molten state.

Composite materials with a thermoplastic matrix are now used as high-performance materials for mass market industries such as land transport (cars, etc.), energy, sports and leisure, farm machinery or machinery for public works, or markets that are more limited but are developing, such as aeronautics. They in fact have good intrinsic mechanical performance, notably ductility, impact toughness, good chemical stability, notably resistance to solvents, and they are fully recyclable.

Unfortunately, during preparation of thermoplastic-based composites, a limiting constraint on the process is the degree of impregnation of the fibrous reinforcement with the polymer in the molten state.

For optimizing this degree of impregnation, in shorter times, various solutions have been developed in recent years, notably including those consisting of using so-called high-fluidity polymers.

Thus, development of novel thermoplastic polymers with low viscosity in the molten state has allowed better impregnation of fibrous reinforcements to be achieved (increase in the proportion of fibers, reduction of process cycle times).

Nevertheless, the viscosity level of these polymers is still high for certain processes such as consolidation in a closed mold at low pressure (liquid composite molding, LCM), or for continuous processes such as injection-pultrusion.

The inventors found, unexpectedly, that this viscosity can be lowered provided that a separate, quite specific polyamide is combined with these polyamides.

Thus, according to one of its aspects, the present invention relates to a thermoplastic composition having improved fluidity in the molten state, comprising at least:

(a) a polyamide that has a melt viscosity greater than or equal to 50 Pa·s, and (b) a non-evolutive polyamide having a melt viscosity lower than the melt viscosity of said polyamide (a), above 0.8 Pa·s, and having a number-average molecular weight Mn lower than that of said polyamide (a), said composition having a stabilized melt viscosity at a value below the melt viscosity of said polyamide (a).

In the sense of the invention, a stabilized viscosity is a viscosity whose value, determined at constant pressure and temperature under an inert atmosphere, fluctuates at most by 25%, or even at most by 20%, preferably at most by 10%, more preferably at most by 5%, even more preferably at most by 2%, advantageously at most by 1% relative to its initial value for a time of at least 15 minutes, preferably at least 30 minutes.

In the sense of the invention, "initial value" means the viscosity measured immediately after formation of a homogeneous mixture in the molten state.

In the present text, for simplicity, polyamides (a) and (b) can be called "high mass" polyamide or polyamide (a) and "low mass" polyamide or polyamide (b), respectively.

The expression "polyamide" is used in the present text to denote a single polyamide or a polyamide mixture, without distinction.

U.S. Pat. Nos. 6,548,591 and 5,274,033 have in fact already proposed combining a low molecular weight polyamide with a high molecular weight polyamide, notably for the purpose of increasing the fluidity of the high molecular weight polyamide in the molten state. However, the low molecular weight polyamides considered in these documents show a gradual increase in molecular weight in the conditions of manufacture of the composite material based on the polyamide mixture in the molten state. They are not inert, and are themselves subject to a phenomenon of polymerization or even of condensation with the high molecular weight polyamide. Therefore they are no longer present in their original form in the mixture, but in the form of a polyamide of higher molecular weight and therefore with increased viscosity.

For their part, documents US 2009/0131569 and US 2009/0131674 propose employing non-evolutive oligomers for improving the fluidity of molten plastic matrixes. These oligomers, by their nature, have a very low molecular weight, notably around 2000 g/mol. However, fluidity is in this case obtained at the expense of the other performance indices of the plastic matrixes thus obtained, and in particular their mechanical properties. In fact, owing to their small size, oligomers migrate to the surfaces and interfaces of the matrix, thus affecting its properties. This phenomenon is particularly troublesome in the context of the manufacture of composite materials, since the fiber-matrix interfaces are required to have high mechanical performance (high modulus, high toughness, adhesion/cohesion).

Against all expectations, the inventors found that all of the aforementioned drawbacks can be overcome with a non-evolutive polyamide such as that considered according to the invention.

As can be seen notably from the examples given hereunder, the composition of the invention proves advantageous in several respects.

Firstly, the use of a thermoplastic composition having improved fluidity allows better impregnation of the reinforcing material, and therefore quicker production of composites, which moreover have low porosity. By using a composition of this kind, it is also possible to produce articles with a high fiber content.

Moreover, the fact that only a small amount of the "low mass" polyamide is used means that the composite obtained from the composition of the invention still has the mechanical properties that are supplied by the "high mass" polyamide, which are generally better than those of the "low mass" polyamide in terms of rigidity (elastic modulus E) and fracture toughness (K1c, Gc).

Thus, according to the invention, although the use of a non-evolutive "low mass" polymer compatible with a "high mass" polyamide allows a significant reduction in the viscosity of the latter, it still does not alter certain properties in the solid state such as the elastic modulus E or the fracture toughness. The presence of a smaller proportion of "low mass" polymer can give a much improved fluidity, while maintaining good mechanical characteristics, which are provided essentially by the "high mass" polymer. It is thus possible to obtain a good compromise between fluidity and fracture toughness (Gc).

According to another of its aspects, the present invention relates to a method for manufacturing a composite comprising at least one step of impregnation of a reinforcing fabric with a composition according to the invention in the molten state.

According to yet another of its aspects, the invention relates to a composite obtained by the method as defined above.

The invention also relates to the use of a non-evolutive polyamide (b), as a viscosity-lowering additive in a composition in the molten state comprising a polyamide (a) having a melt viscosity greater than or equal to 50 Pa·s, said polyamide (b) having a melt viscosity lower than the melt viscosity of said polyamide (a), above 0.8 Pa·s, and a number-average molecular weight Mn lower than that of said polyamide (a).

Advantageously, the amount of compound (b) is adjusted in order to lower the melt viscosity of said composition in which it is incorporated to a value below 50% of the melt viscosity of said polyamide (a), preferably below 30% of the melt viscosity of said polyamide (a), in particular below 25% of the melt viscosity of said polyamide (a).

In the context of the present invention, all the viscosities expressed in the molten state are measured using a cone-and-plate rheometer with a diameter of 25 mm under nitrogen, using an up-down shear scan from $10^{-1}$ to $10^2$ s$^{-1}$ at 100% strain in dynamic mode with a continuous frequency scan in isothermal conditions. This measurement is carried out at a temperature more than 10° C. above the melting point (Tm) of the material in question, if semicrystalline, preferably from 15° C. to 30° C. above this temperature, and at a temperature T ranging from 80° C. to 200° C., or from 100° C. to 200° C., above its glass transition temperature (Tg) if amorphous (with T<325° C.), and for a frequency of 10 Hz. Preferably, the viscosities of the "high mass" polyamides, if amorphous, are measured in the upper part of the aforementioned range "+80° C. to +200° C.", for example from "+150° C. to +200° C.". Preferably, the viscosities of the "low mass" polyamides, if amorphous, are measured in the lower part of the aforementioned range "+80° C. to +200° C.", for example from "+80° C. to +150° C.".

For this purpose, the material in question is introduced in the dry state (RH=0, RH for relative humidity) in the form of granules or of powder ground between the plates of the rheometer, then melted, so as to form a liquid film 50 μm thick, on which the measurement is then performed.

When viscosity measurement involves a composition according to the invention, it is carried out on a homogeneous mixture of this composition.

In the sense of the invention, the term homogeneous describes a composition or mixture in which the two polyamides (a) and (b) are uniformly distributed. This guarantees the same value of melt viscosity at every point of the mixture.

COMPOSITION ACCORDING TO THE INVENTION

As is clear from the foregoing, the compositions according to the invention are quite particularly interesting because in the molten state they possess two separate populations of polyamides, the first population consisting of the "low mass" polyamide or polyamides, and the second consisting of the "high mass" polyamide or polyamides. As a result, the viscosity lowering effect due to the presence of the so-called "low mass" polyamide remains advantageously effective throughout the process of transformation of the "high mass" polyamide in the molten state and thus makes it possible to optimize the degree of impregnation of the mixture, for example on a reinforcing fabric.

This preservation of the viscosity lowering function of the "low mass" polyamide is revealed in particular in the examples given hereunder. The viscosity of the mixture does not vary significantly over time, and moreover remains advantageously lower than that of the "high mass" polyamide in the molten state.

As a result, a composition according to the invention has a lower melt viscosity than the polyamide or polyamide mixture (a) that it contains.

Advantageously, the composition according to the present invention has a melt viscosity below 50% of the melt viscosity of said polyamide (a), preferably below 30% of the melt viscosity of said polyamide (a), in particular below 25% of the melt viscosity of said polyamide (a).

As already stated, this melt viscosity is, moreover, stabilized.

In other words, it varies, and in particular increases, at most by 25%, or at most by 20%, preferably at most by 10%, more preferably at most by 5%, even more preferably at most by 2%, advantageously at most by 1% relative to its initial value for a time of at least 15 minutes, preferably at least 30 minutes at constant temperature and pressure under an inert atmosphere, for example under nitrogen.

This viscosity is measured according to the protocol mentioned above.

A composition according to the invention may comprise a content of polyamide (a) ranging from 50 to 95 wt %, preferably from 70 to 95 wt %, in particular from 80 to 95 wt %, more preferably from 90 to 95 wt % relative to the total weight of the composition.

A composition according to the invention may comprise a content of polyamide (b) greater than or equal to 5 wt %, and less than or equal to 50 wt %, advantageously between 5 and 30 wt %, in particular between 5 and 20 wt %, notably between 5 and 12 wt %, relative to the total weight of the composition.

Thus, a composition according to the invention advantageously comprises:
(a) from 55 to 95 wt % of "high mass" polyamide;
(b) from 5 to 45 wt % of "low mass" polyamide.
Preferably, it comprises:
(a) from 70 to 95 wt % of "high mass" polyamide;
(b) from 5 to 30 wt % of "low mass" polyamide.
In particular, it comprises:
(a) from 80 to 95 wt % of "high mass" polyamide;
(b) from 5 to 20 wt % of "low mass" polyamide.
In particular, it comprises:
(a) from 80 to 95 wt % of "high mass" polyamide;
(b) from 5 to 20 wt % of "low mass" polyamide.
More preferably, it comprises:
(a) from 90 to 95 wt % of "high mass" polyamide;
(b) from 5 to 10 wt % of "low mass" polyamide.

The "high mass" polyamide and the "low mass" polyamide may be present in the composition of the invention in a ratio of polyamide (b) to polyamide (a) ranging from 5/95 to 1/1, preferably from 5/95 to 3/7, in particular from 5/95 to 2/8 and even more preferably from 5/95 to 1/9.

As already stated, the invention has the advantage that, in the molten state, it preserves the two families of polyamides (a) and (b) according to the invention, for a sufficient time. The liquefying phenomenon observed leads to a large drop in viscosity, even for low levels of polyamide (b) (for example 10 wt %).

As already stated, these two types of polyamides differ in that they have different viscosity, which is also representative of a difference of molecular weight.

In particular, polyamide (a) may have a number-average molecular weight Mn greater than or equal to 8000 g/mol, preferably greater than or equal to 8500 g/mol. Preferably, it has a number-average molecular weight between 8000 and 40000 g/mol, in particular between 8000 and 30000 g/mol and even more particularly between 8500 and 25000 g/mol.

The weight-average molecular weight Mw of polyamide (a) may range from 16000 g/mol to 70000 g/mol, in particular from 16000 g/mol to 40000 g/mol.

Regarding polyamide (b), in any case it has a number-average molecular weight Mn lower than that of polyamide (a). It may have a number-average molecular weight ranging from 5000 to 8500 g/mol, preferably from 5000 to 8000 g/mol, and a weight-average molecular weight Mw from 10000 g/mol to 17000 g/mol, preferably from 10000 to 16000 g/mol, more preferably from 10000 to 15000 g/mol, in particular from 10000 g/mol to 14000 g/mol.

It should be noted that the molecular weights given for these polymers are essentially offered as a guide to the weight range. It should be noted that a specific molecular weight can be determined in many ways, which are familiar per se to a person skilled in the art.

To illustrate these methods, we may notably mention that based on analysis of end groups, and in particular that employing measurement by gel permeation chromatography (GPC), also called size exclusion chromatography (SEC). In general, GPC measurements of a polyamide may be carried out in dichloromethane (solvent and eluent), after chemical modification of the polyamide in order to dissolve it. A UV detector is used, as the chemically modified polyamide has a UV chromophore. Calculation of the molecular weight distribution and of the average molecular weights Mn and Mw may be based on polystyrene equivalents (PST) or absolute molecular weight, after calibration with commercially available standards. If necessary, measurements based on absolute molecular weights may be carried out by viscosimetric detection. In the context of the present invention, the average molecular weights Mn and Mw are expressed in absolute mass. Mn and Mw may be calculated from the overall distribution or after truncation of the low masses if we do not wish to take into account the contribution from the cyclic oligomers.

According to a preferred variant, polyamides (a) and (b) are structurally similar to one another, or are even derived from the same polyamide, the melting point of polyamide (b) preferably being less than or equal to that of polyamide (a).

I. "Low Mass" Polyamide (b)

As is clear from the foregoing, the "low mass" polyamide is a non-evolutive polyamide.

"Non-evolutive" polyamide means, in the sense of the invention, a polyamide that remains inert in the molten state. In other words, in the molten state, essentially it is not subject to a phenomenon of polymerization or of condensation with other additional compounds, in this case the "high mass" polyamide with which it is combined.

This quasi chemical inertia is reflected notably in the manifestation of a stable value of melt viscosity, i.e. which varies at most by 25%, or even at most by 20%, preferably at most by 10%, more preferably at most by 5%, even more preferably at most by 2%, for a time of at least 15 minutes, preferably at least 30 minutes at constant temperature and pressure under an inert atmosphere (for example under nitrogen) as indicated above.

This viscosity is measured according to the protocol described in detail above.

Moreover, as already mentioned, polyamide (b) has a melt viscosity lower than that of polyamide (a) and above 0.8 Pa·s.

For example, such a polyamide may have a melt viscosity below 50 Pa·s, preferably less than or equal to 30 Pa·s, preferably less than or equal to 25 Pa·s, in particular ranging from 1 to 25 Pa·s, or even from 1 to 20 Pa·s.

The "low mass" polyamides having a viscosity index VI varying from 80 to 48 mL/g, like certain PA 66s for example, are quite particularly suitable for the invention. It should be noted that this index is generally determined according to standard ISO 307 in formic acid.

In the sense of the invention, polyamide (b) is not comparable to an oligomer. In fact, oligomers have a number-average molecular weight below 5000 g/mol and it is generally around 2000 g/mol. The oligomers, owing to their nature, have a melt viscosity at most equal to 0.1 Pa·s when it is measured according to the protocol of the invention. In contrast, as already stated, polyamide (b) has a melt viscosity above 0.8 Pa·s, and preferably a number-average molecular weight ranging from 5000 to 8500 g/mol, in particular from 5000 to 8000 g/mol.

According to a first embodiment of the invention, polyamide (b) is non-evolutive owing to a low concentration of reactive end groups.

In the sense of the invention, the expression "reactive end groups" denotes the free amine and carboxyl units present on said polyamide.

The amounts of amine end groups (AEG) and/or carboxyl end groups (CEG) may be determined by potentiometric analysis after complete dissolution of the polyamide in question, for example in trifluoroethanol, and addition of a strong base in excess. The basic species are then titrated with an aqueous solution of strong acid.

The polyamides (b) having a concentration of amine end groups (AEG) and/or of carboxyl end groups (CEG) less than or equal to 20 meq/kg, preferably less than or equal to 15 meq/kg, in particular less than or equal to 10 meq/kg, even more preferably less than or equal to 5 meq/kg, quite particularly equal to 0 meq/kg, are thus quite particularly suitable for the invention.

We may mention, as being representative of this type of polyamide (b), those possessing:
AEG of 0 meq/kg and CEG of 500 meq/kg;
AEG of 400 meq/kg and CEG of 0 meq/kg;
(AEG) less than or equal to 5 meq/kg, and (CEG) between 100 and 1000 meq/kg; and
(CEG) less than or equal to 5 meq/kg, and (AEG) between 100 and 1000 meq/kg.

Said polyamides according to the invention may be manufactured in many ways and are familiar per se to a person skilled in the art. Document WO 2010/034771 notably proposes processes for preparing such polyamides. For example, said polyamides may be manufactured by addition in polymerization, notably at the start, during or at the end of polymerization, of the monomers of the polyamide, in the presence additionally of specific bifunctional and/or monofunctional compounds.

These bifunctional and/or monofunctional compounds possess amino or carboxylic acid functions that are able to react with the monomers of the polyamide and are used in proportions such that the resultant polyamide has an AEG or CEG according to the invention.

To obtain "low mass" polyamides according to this embodiment of the invention by polymerization, we may notably use the relation DPn=(1+r)/(1+r-2pr), in which DPn is the degree of polymerization of the polyamide, r is the AEG/CEG or CEG/AEG ratio, below 1, introduced during the polymerization, and p corresponds to the progress of the reaction.

It is also possible to mix bifunctional and/or monofunctional compounds with a polyamide, notably by extrusion, generally reactive extrusion, so as to obtain a polyamide (b) according to the present invention.

Any type of aliphatic or aromatic mono- or dicarboxylic acids or all types of aliphatic or aromatic mono- or diamines may be used. The following may notably be used as monofunctional compound: n-dodecylamine and 4-amino-2,2,6,6-tetramethylpiperidine, acetic acid, lauric acid, benzylamine, benzoic acid and propionic acid. The following may notably be used as bifunctional compound: adipic acid, terephthalic acid, isophthalic acid, sebacic acid, azelaic acid, dodecanedioic acid, decanedioic acid, pimelic acid, suberic acid, fatty acids dimers, di([beta]-ethylcarboxy)cyclohexanone, hexamethylenediamine, methyl-5 pentamethylenediamine, metaxylylenediamine, butanediamine, isophorone diamine, 1,4-diaminocyclohexane, 3,3',5-trimethylhexamethylenediamine.

It is also possible to use an excess of adipic acid or an excess of hexamethylenediamine for producing a polyamide of type 66 having high melt fluidity and a concentration of amine end groups (AEG) or of carboxyl end groups (CEG) below 20 meq/kg.

It is also possible to lower the concentrations of acid or amine end groups of a polyamide considerably by carrying out vacuum finishing at the end of polymerization so as to remove the water in order to consume all or nearly all the end groups and thus guarantee that the polyamide will not change further in the sense of increase in molecular weight regardless of the application conditions of the composite, notably under pressure or under vacuum.

According to a second embodiment of the invention, polyamide (b) is non-evolutive owing to the presence of chain blockers.

"Chain blocker", also called "monofunctional molecule" or "chain limiter", denotes, in the sense of the invention, a molecule which, by reacting with the monomers of the polyamide, gives rise to the formation of a single covalent bond.

The reactive function of the chain limiter may be a carboxylic acid or derivatives thereof, such as acyl chloride, ester, amide, vicinal diacid, acid anhydride, an amine, an aldehyde, a ketone, a halide, an isocyanate, a urea, an alcohol, a thiol. The functional molecule may further comprise one or more heteroatoms not taking part in the reaction with the monomers of the polyamide.

According to this embodiment, a composition according to the invention may comprise a polyamide (b) having:
- a concentration of amine end groups (AEG) greater than or equal to 25 meq/kg;
- a concentration of acid end groups (CEG) greater than or equal to 25 meq/kg; and
- a concentration of blocked end groups (BEG) greater than or equal to 25 meq/kg.

Still according to this second embodiment, the polyamide resins (b) according to the invention may have a concentration of amine end groups (AEG) greater than or equal to 25 meq/kg and preferably less than or equal to 220 meq/kg, more preferably greater than or equal to 30 meq/kg and less than or equal to 150 meq/kg.

Said polyamides may have a concentration of carboxyl end groups (CEG) greater than or equal to 25 meq/kg and preferably less than or equal to 220 meq/kg, more preferably greater than or equal to 30 meq/kg and less than or equal to 150 meq/kg.

Said polyamides may have a concentration of blocked end groups (BEG) greater than or equal to 25 meq/kg and preferably less than or equal to 250 meq/kg, more preferably greater than or equal to 30 meq/kg and less than or equal to 200 meq/kg.

This relationship between the four variables Mn, AEG, BEG and CEG may be adjusted using the following relation: $Mn=2000000/(AEG+CEG+BEG)$, which is quite familiar to a person skilled in the art. A suitable polyamide (b) of molecular weight $Mn=6000$ g/mol may thus have for example an AEG of 40 meq/kg, a CEG of 80 meq/kg and a BEG=213 meq/kg.

Thus, the amount of chain limiter is calculated from the ratio of the molar amount of chain limiter added to the mass of polymer produced. The amount of chain limiter may also be determined by hydrolysis of the polyamide followed by analysis by liquid chromatography.

Said polyamides according to the invention may be manufactured in many ways and are familiar per se to a person skilled in the art. Document WO2011/073200 notably proposes processes for preparing such polyamides.

Such polyamides may for example be manufactured by addition in polymerization, notably at the start, during or at the end of polymerization of the monomers of the polyamide, in the presence of monofunctional compounds and optionally other bifunctional compounds, notably as defined for the first embodiment, intended for adjusting the stoichiometry between the reactive functions, which was disturbed by adding the monofunctional compound.

It is also possible to mix monofunctional and optionally bifunctional compounds with a polyamide, notably by extrusion, generally reactive extrusion, so as to obtain the polyamide resin used according to the present invention.

It is also possible to add polyfunctional molecules as well, such as bishexamethylene triamine, for example.

To obtain concentrations of acid and amine end groups of a polyamide above 25 meq/kg, it is not generally necessary to carry out a finishing operation under vacuum at the end of polymerization.

"High Mass" Polyamide (a)

In the sense of the present invention, a "high mass" polyamide is a polyamide having a melt viscosity greater than or equal to 50 Pa·s and preferably ranging from 50 to 2000 Pa·s, preferably from 60 to 800 Pa·s.

This viscosity value, measured according to the protocol presented above, is more particularly representative of a polyamide having a number-average molecular weight Mn greater than or equal to 8000 g/mol, preferably greater than or equal to 8500 g/mol, in particular between 8000 and 35000 g/mol, preferably between 8000 and 30000 g/mol, in particular between 8500 and 20000 g/mol.

Subject to the specific points detailed above for each of the two types of polyamide considered in a composition according to the invention, these polyamides (a) and (b) may be obtained according to conventional operating conditions for polymerization of polyamides, continuously or discontinuously.

Thus, independently of one another, polyamides (a) and (b) suitable for the invention may be aliphatic or semi-aromatic, semicrystalline or amorphous.

Polyamides (a) and (b) may notably be selected independently of one another from the group comprising polyamides obtained by polycondensation of at least one aliphatic dicarboxylic acid with an aliphatic or cyclic diamine or between at least one aromatic dicarboxylic acid and an aliphatic or aromatic diamine, the polyamides obtained by polycondensation of at least one amino acid or lactam with itself, or a mixture thereof and (co)polyamides.

The polyamides of the invention may notably be polymers comprising star or H macromolecular chains, with arms, branched, hyper-branched, and if applicable, linear macromolecular chains. Polymers comprising said star or H macromolecular chains are described for example in documents FR2743077, FR2779730, U.S. Pat. No. 5,959,069, EP0632703, EP0682057 and EP0832149.

The star-structured polyamides are known to possess improved fluidity relative to linear polyamides.

Star macromolecular chains comprise a center and at least three polyamide arms. The arms are joined to the center by a covalent bond, via an amide group or a group of some other nature. The center is an organic or organometallic chemical compound, preferably a hydrocarbon-containing compound optionally comprising heteroatoms, to which the arms are joined. The arms are polyamide chains. The polyamide chains forming the arms are preferably of the type obtained by polymerization of lactams or amino acids, for example of the polyamide 6 type. The polyamide with star structure according to the invention optionally comprises linear polyamide chains, besides the star chains. In this case, the weight ratio of the amount of star chains to the sum of the amounts of star chains and linear chains is between 0.5 and 1 inclusive. It is preferably between 0.6 and 0.9.

These star-structured polyamides, i.e. comprising star macromolecular chains, may be obtained by copolymerization of a mixture of monomers comprising at least:

a) monomers of the following general formula (I):

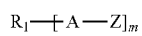

(I)

b) monomers of the following general formulas (Ma) and (Mb):

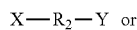

(IIa)

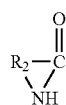

(IIb)

c) optionally monomers of the following general formula (III) or (IV):

(III)

or

(IV)

in which:
$R_1$ is a hydrocarbon-containing radical comprising at least 2 carbon atoms, linear or cyclic, aromatic or aliphatic and that may comprise heteroatoms;
A is a covalent bond or an aliphatic hydrocarbon-containing radical that may comprise heteroatoms and comprises from 1 to 20 carbon atoms;
Z represents a primary amine function or a carboxylic acid function;
Y is a primary amine function when X represents a carboxylic acid function, or Y is a carboxylic acid function when X represents a primary amine function;
$R_2$, $R_3$, $R_4$, which may be identical or different, represent substituted or unsubstituted aliphatic, cycloaliphatic or aromatic hydrocarbon-containing radicals comprising from 2 to 20 carbon atoms and may comprise heteroatoms; and
m represents an integer between 3 and 8.

In particular, radical $R_1$ is either a cycloaliphatic radical such as the tetravalent cyclohexanonyl radical, or a 1,1,1-triyl-propane, 1,2,3-triyl-propane radical. Examples of other radicals $R_1$ suitable for the invention that we may mention are the substituted or unsubstituted trivalent radicals of phenyl and cyclohexanyl, the tetravalent radicals of diaminopolymethylene with a number of methylene groups advantageously between 2 and 12 such as the radical derived from EDTA (ethylenediaminetetraacetic acid), the octavalent radicals of cyclohexanonyl or cyclohexadinonyl, and the radicals derived from compounds resulting from the reaction of polyols such as glycol, pentaerythritol, sorbitol or mannitol with acrylonitrile.

Thus, at least two different radicals $R_2$ may be used in the monomers of formula (II).

Radical A is preferably a methylene or polymethylene radical such as the ethyl, propyl or butyl radicals or a polyoxyalkylene radical such as the polyoxyethylene radical.

The number m may be for example greater than or equal to 3 and advantageously equal to 3 or 4. The reactive function of the polyfunctional compound represented by the symbol Z is a function capable of forming an amide function.

As compounds representative of a compound of formula (I), we may notably mention 2,2,6,6-tetra-(β-carboxyethyl) cyclohexanone, trimesic acid, 2,4,6-tri-(aminocaproic acid)-1,3,5-triazine and 4-aminoethyl-1,8-octanediamine.

These processes for obtaining these star polyamides are described in documents FR2743077 and FR2779730. These processes lead to the formation of star macromolecular chains, optionally mixed with linear macromolecular chains. If a comonomer of formula (III) is used, the polymerization reaction is advantageously carried out until thermodynamic equilibrium is attained.

The star-structured polyamides may essentially be obtained, for example using an extrusion device, by mixing a molten polyamide of the type obtained by polymerization of lactams and/or of amino acids and a monomer of formula (I).

These production processes are described in patents EP0682070 and EP0672703.

The mixture of monomers as the basis for the star macromolecular chains may comprise other compounds, such as chain limiters, notably in the context of preparing polyamides (b) or catalysts.

Polyamides (a) and (b) may also be, independently of one another, polymers of the random tree type, preferably copolyamides having a random tree structure.

These copolyamides with a random tree structure and the method for producing them are notably described in document WO99/03909.

Polyamides (a) and (b) of the invention may also comprise, independently of one another, hydroxyaromatic units bound chemically to the chain of the polyamide. For this we use a hydroxyaromatic organic compound, which is a compound comprising at least one aromatic hydroxyl group and at least one function capable of binding chemically to the acid or amino functions of the polyamide, which once bound chemically to the polyamide chain becomes a hydroxyaromatic unit. This compound is preferably selected from the group comprising 2-hydroxyterephthalic acid, 5-hydroxyisophthalic acid, 4-hydroxyisophthalic acid, 2,5-dihydroxyterephthalic acid, 4-hydroxyphenylacetic acid or gallic acid, L-tyrosine, 4-hydroxyphenylacetic acid, 3,5-diaminophenol, 5-hydroxy-m-xylylenediamine, amino-3-phenol, amino-3-methyl-4-phenol, and hydroxy-3 amino-5 benzoic acid.

The "low mass" and "high mass" polyamides of the invention may in particular be selected independently of one another from the group comprising the polyamides obtained by polycondensation of at least one aliphatic dicarboxylic acid with an aliphatic or cyclic diamine, for example those representative of the families PA 66, PA 6.10, PA 6.12, PA 12.12, PA 4.6, MXD 6 or between at least one aromatic dicarboxylic acid and an aliphatic or aromatic diamine such as the polyterephthalamides, polyisophthalamides, polyaramides, or a mixture thereof and (co)polyamides. The polyamide of the invention may also be selected from the polyamides obtained by polycondensation of at least one amino acid or lactam with itself, and the amino acid may be generated by lactam ring opening by hydrolysis, for example the families with the references PA 6, PA 7, PA 9, PA 10T, PA 11, PA 12, PA 13, or a mixture thereof and (co)polyamides. The polyamides of the invention may also be selected from the group of the polyamides obtained by polycondensation of diacid, diamine and amino acid such as the PA 6.6/6 copolyamides.

Polyamides (a) and (b) may notably be selected independently of one another from the families with the references PA 6, PA 7, PA 10, PA 11, PA 12, PA 46, PA 66, PA 69, PA 610, PA 612, PA 9T, PA 10T, PA 4.6, PA 6.10, PA 6.12, PA 12.12, PA 6.66, MXD 6, PA 6TXT, PA 66/6T, PA 66/6I, PA6T/6I, PA 6T/6I/66, PA 6.6/6.

The composition of the invention may also comprise the copolyamides derived notably from the above polyamides, or the mixtures of these polyamides or copolyamides as polyamide.

Preferably, polyamides (a) and (b) are selected independently of one another from the families with the references PA 66, PA 6.10, PA 6.12, PA 12.12, PA 4.6, MXD 6, PA 6, PA 7, PA 9T, PA 10T, PA 11, PA 12, PA 6T/6I, PA 6T/6I/66, the copolyamides derived therefrom, and mixtures thereof.

The composition according to the invention preferably has a total content of polyamide ranging from 85 to 100 wt %, preferably from 95 to 100 wt %, relative to the total weight of the composition.

The composition may also comprise, depending on the desired final property, one or more other polymers, with or without a compatibilizing agent, for example polyethylene, polystyrene, ABS resin, polyphenylene sulfide, polyphenylene oxide, polyacetal, polysulfone, polyethersulfone, polyetherimide, polyetherketone, a polysulfone resin, an optionally functionalized elastomer resin or mixtures thereof.

A composition according to the invention may also comprise all the additives usually employed in the compositions based on thermoplastic polymers and notably used in the manufacturing process for composites.

Thus, the composition according to the invention may notably comprise, as additives, at least one plasticizer of the oligomer type selected from the cyclic ester oligomers, ether oligomers, and mixtures thereof. It may also comprise at least one antiplasticizer of the phenolic polymer type.

Preferably, the composition of the invention comprises both an oligomer as mentioned above and a phenolic polymer, these last two advantageously being present in a weight ratio of phenolic polymer to oligomer varying from 0.25 to 6, preferably from about 0.75 to 2.75.

In fact, adding these two additives in the aforementioned ratio advantageously allows further reduction of the melt viscosity of a polyamide composition.

As a particularly preferred oligomer, we may notably mention the cyclic polyester oligomers such as cyclized poly(butylene terephthalate) (PBT) or mixtures containing it, such as the resin CBT 100 marketed by CYCLICS CORPORATION, for example.

Preferably, when the composition comprises at least one oligomer as mentioned above as additive, the latter is present in a content ranging from 1 to 10 wt % relative to the total weight of the composition.

As a particularly preferred phenolic polymer, we may notably mention the Novolac® resins.

Preferably, when the composition comprises at least one phenolic polymer as mentioned above as additive, the latter is present in a content ranging from 1 to 15 wt % relative to the total weight of the composition.

Of course, a composition according to the invention may also comprise other additives.

The following may notably be mentioned as examples of additives: thermal stabilizers, plasticizers, antioxidants, lubricants, pigments, dyes, reinforcing fillers, impact strength modifiers, nucleating agents, catalysts, light and/or thermal stabilizers, antistatic agents, matting agents, molding aids and other conventional additives.

Regarding more particularly the impact strength modifiers, these are generally elastomer polymers. The agents for modifying toughness are generally defined as having a tensile modulus ASTM D-638 below about 500 MPa. Examples of suitable elastomers are ethylene-acrylic ester-maleic anhydride, ethylene-propylene-maleic anhydride, ethylene-propylene-diene monomer (EPDM) optionally with a grafted maleic anhydride. The concentration of elastomer by weight is advantageously between 0.1 and 30% relative to the total weight of the composition.

Impact modifiers are notably preferred comprising reactive functional groups with thermoplastic polymers, in particular with polyamides. We may mention for example the terpolymers of ethylene, acrylic ester and glycidyl methacrylate, the copolymers of ethylene and butyl ester acrylate, the copolymers of ethylene, n-butyl acrylate and glycidyl methacrylate, the copolymers of ethylene and maleic anhydride, the styrene-maleimide copolymers grafted with maleic anhydride, the styrene-ethylene-butylene-styrene copolymers modified with maleic anhydride, the styrene-acrylonitrile copolymer grafted with maleic anhydrides, the acrylonitrile/butadiene/styrene copolymers grafted with maleic anhydrides, and their hydrogenated versions. We may also mention agents of the silicone elastomer type (stress relief). The proportion of these agents by weight in the total composition is notably between 0.1 and 20%.

Additives for improving the quality of the reinforcing fabric/thermoplastic polymer interfaces may also be used. These additives may for example be incorporated in the composition.

Such additives may for example be coupling agents such as those of the aminosilane or chlorosilane type, or else liquefying or wetting agents, or a combination thereof.

Reinforcing fillers may be incorporated in the thermoplastic composition. These fillers may be selected from fibrous fillers, for example short glass fibers, or nonfibrous fillers such as kaolin, talc, silica, mica or wollastonite. Their size is generally between 0.8 and 15 Submicron or even nanometric fillers may also be used, alone or supplementing the other fillers.

These fillers and additives are preferably added to the "high mass" polyamide before making the final thermoplastic composition, by usual means appropriate to each filler or additive, for example during polymerization or mixing when molten.

The compositions of the invention are generally obtained by mixing the various constituents when hot, preferably in an extruder (single-screw or twin-screw) equipped with a suitable screw profile, at a temperature sufficient to maintain the thermoplastic matrix in the molten state. Generally, the mixture obtained is extruded in the form of rods, which are chopped into pieces to form granules. The constituents of the composition are generally added together. Addition of the optional additives may be carried out by adding these compounds to the mixture of the molten polyamides (a) and (b), preferably to the high mass polyamide (a).

Process

As is clear from the foregoing, according to one of its aspects, the present invention relates to a method for manufacturing a composite comprising at least one step of impregnation of a reinforcing fabric with a composition according to the invention in the molten state.

Fabric means a textile surface of threads or fibers optionally consolidated by any method, such as notably gluing, felting, braiding, weaving, knitting. These fabrics are also designated as fibrous or filamentous networks.

Thread means a monofilament, a continuous multifilament thread, a yarn of fibers, obtained from a single type of fiber or from an intimate mixture of several types of fibers. Continuous thread may also be obtained by assembling several multifilament threads.

Fiber means a filament or an assembly of cut, cracked or converted filaments.

The reinforcing threads and/or fibers according to the invention are preferably selected from threads and/or fibers of carbon, glass, aramids, polyimides, flax, hemp, sisal, coir, jute, kenaf and/or a mixture thereof.

The step of impregnation of the thermoplastic composition of the invention and of the reinforcing fabric may be carried out in various ways, by various possible methods. It is perfectly possible to carry out the impregnation of one or more reinforcing fabrics.

As examples of processes that are suitable for the present invention, we may notably mention the molding processes, such as injection molding, pultrusion, for example pultrusion-injection.

When the thermoplastic composition of the invention has a viscosity above 30 Pa·s, or even above 50 Pa·s, manufacture of composite materials can only be carried out by so-called indirect processes, i.e. in which the fabric and the thermoplastic composition are combined before carrying out impregnation of the reinforcing fabric.

As an example of such a method, we may notably mention the film stacking process, followed by a forming step such as stamping, optionally with a final duplicate molding step.

When the thermoplastic composition of the invention has a low viscosity, i.e. less than or equal to 50 Pa·s, or even less than or equal to 30 Pa·s, besides the so-called indirect processes as mentioned above, it may also be used in direct processes, i.e. using it directly in the molten state, as in injection molding (LCM) and pultrusion, notably by injection.

The direct processes are preferred for compositions of this type.

As an injection molding process, we may for example mention the resin transfer molding (RTM) process. This process comprises injecting the molten thermoplastic composition into a closed mold comprising at least one or more reinforcing fabrics. The interior of the mold may be at a temperature of more or less 50° C. relative to the melting point of the thermoplastic composition. Then cooling of the mold and of the article obtained may be carried out, finally recovering said article. This process may be carried out under pressure.

A variant of this process called the C-RTM process, also called injection-compression, may also be used in the present invention. It differs from the RTM process in that the mold gap is slightly open during injection of the composition in the molten state. The article is then consolidated and adjusted to size by closing the mold, under pressure.

After impregnation of the reinforcing fabric with the polyamide, the article is obtained by solidification of the matrix. Cooling may advantageously be carried out rapidly so as to avoid any appreciable crystallization of the polyamide, notably to maintain the properties of the article. Cooling may notably be carried out in less than 5 minutes, more preferably in less than one minute. The mold may for example be cooled by circulating a cold fluid. The composite article may also optionally be transferred to a cold mold, optionally under pressure.

As mentioned above, when the viscosity of the thermoplastic composition is less than or equal to 30 Pa·s, the composite of the invention may advantageously be produced by pultrusion.

Preferably, said pultrusion process is carried out by injection, which then corresponds to a pultrusion-injection process.

The pultrusion technique consists of pulling one or more threads and continuous fibers through a heated die so as to impregnate them with a molten thermoplastic resin to obtain a rod or finished or semifinished article.

In the pultrusion-injection process, the molten polymer is injected at the level of the heated die in order to impregnate the reinforcing fabric, which is also fed into this die.

Article

The present invention also relates to an article that is obtainable by the method of the invention. The article may notably be a composite based on polyamide comprising a reinforcing fabric.

The articles according to the invention preferably comprise between 25 and 70 vol %, in particular between 45 and 65 vol % of reinforcing fabric relative to the total volume. The composite articles preferably have, for a level of reinforcement of 50 vol %, a breaking stress above 450 MPa and an elastic modulus greater than 20 GPa in the case for example of glass reinforcement (for a void percentage typically between 0 and 2%). The articles of the invention may be finished articles, or semifinished articles, which may also be called prepregs. Composite articles in the form of plates may for example undergo thermoforming to give them a specified shape after cooling. The invention thus relates to composite articles obtainable by the method according to the present invention.

The articles of the invention may notably be profiles, when the method of manufacture used is a pultrusion process.

The articles of the invention may also be structures of the sandwich type, having a core inserted between two skins. The composites of the invention may be used to form the outer layers, combining them with a core of the honeycomb type or foam type. The layers may be assembled by chemical or thermal bonding. The composite structures according to the invention may be used in many fields such as aeronautics, the automobile, energy, and electricity-generating industry, and the sports and leisure industry. These structures may be used for making sports articles such as skis or else for making various surfaces such as special flooring, partitions, vehicle bodies, or billboards. In aeronautics, these structures are used notably for fairings (fuselage, wing, tail unit). In the automobile industry, they are used for example for floors, supports such as the front and rear units, or for structural components.

In the description and in the following examples, unless stated otherwise, the percentages are percentages by weight and the ranges of values worded in the form "between . . . and . . . " include the stated lower and upper limits.

The examples that follow are presented for purposes of illustration and do not limit the extent of the invention.

EXAMPLES

Protocols and Methods

The melt viscosities of the polyamides employed were measured using a Rheometrics RDA3 rheometer (a rheometer comprising a 25-mm cone-and-plate device) according to the aforementioned measurement protocol, at a temperature of 280° C.

The molecular weights of the polyamides were found by measurement by gel permeation chromatography (GPC), also called size exclusion chromatography (SEC). The GPC measurements of PA66s are carried out in dichloromethane (solvent and eluent), after chemical modification of the polyamide to solubilize it. A UV detector is used, as the chemically modified polyamide has a UV chromophore. The molecular weight distribution and the average molecular weights Mn and Mw are calculated in polystyrene equivalents, after calibration with commercially available standards. Measurements based on absolute molecular weights are carried out by viscosimetric detection. Mn and Mw may be calculated from the overall distribution or after truncation of the low molecular weights if we do not wish to take into account the contribution from the cyclic oligomers.

Example 1: Thermoplastic Compositions Based on PA66

Compositions according to the invention or comparative compositions based either on a polyamide of type PA66 STABAMID® 22FE1 or a polyamide of type PA66 STAB-AMID® 26AE1, both marketed by SOLVAY, as polyamide (a), whose viscosity we aim to reduce, are prepared.

Polyamide PA66 STABAMID® 22FE1, considered alone in control composition 1, has a melting point of 260° C., a melt viscosity of about 68 Pa·s, and a number-average molecular weight Mn of 8500 g/mol.

Polyamide PA66 STABAMID® 26AE1, considered alone in control composition 2, has a melting point of 262° C., a melt viscosity of about 500 Pa·s, and a number-average molecular weight Mn of 20400 g/mol.

Compositions 1 to 9 were each supplemented with an ancillary compound intended to improve their fluidity in the molten state.

These compounds are:
either a plasticizer, namely cyclized poly(butylene terephthalate) (CBT 100 marketed by CYCLICS CORPORATION) (comparative compositions 1, 2 and 7);
or a non-evolutive polyamide PA66, so-called "low mass", designated SHF51 (compositions 5, 6 and 9);
or polyphenylene ether PPE (grade SA120 from Sabic, having a molecular weight Mn of 2300 g/mol) (comparative compositions 3, 4 and 8);

in the contents by weight given in Table 1 below.

The "low mass" polyamide PA66 SHF51 has a melting point of 262° C., a number-average molecular weight Mn of 8650 g/mol (truncation 300 g/mol), a weight-average molecular weight Mw of 14600 g/mol, a melt viscosity of about 6 Pa·s and a viscosity index VI of 52.5 mL/g (determined in formic acid according to ISO 307).

It is obtained by adding acetic acid during polymerization, and has an AEG content equal to 64.5 meq/kg, a CEG content equal to 62 meq/kg, and a BEG content equal to 198 meq/kg.

Polyamide PA66 SHF51 is synthesized according to a standard method for synthesis of polyamide 66 followed by a finishing step for 15 minutes. The molten product is then extruded via the pouring valve and collected on a metal plate, on which it crystallizes. The crystallized polyamide is ground and then dried, finally obtaining a powder that is ready to use.

The compositions in the following Table 1 are obtained by mixing the various constituents in the molten state by batch extrusion using a twin-screw Microcompounder (DSM): speed 100 rpm, residence time 4 minutes, at 280° C., under a stream of nitrogen.

The viscosity of the compositions is measured according to the same protocol as for the polyamides.

The results obtained are shown in Table 1 below.

TABLE 1

|  | PA66 22FE1 (in wt %) | PA66 26AE1 (in wt %) | CBT 100 (in wt %) | PA66 SHF51 (in wt %) | PPE (in wt %) | Viscosity (in Pa · s) |
|---|---|---|---|---|---|---|
| Control 1 | 100 | 0 | 0 | 0 | 0 | 68 |
| Composition 1 (not according to the invention) | 96 | 0 | 4 | 0 | 0 | 30 |
| Composition 2 (not according to the invention) | 80 | 0 | 20 | 0 | 0 | 45 |
| Composition 3 (not according to the invention) | 95 | 0 | 0 | 0 | 5 | 70 |
| Composition 4 (not according to the invention) | 90 | 0 | 0 | 0 | 10 | 70 |

TABLE 1-continued

| | PA66 22FE1 (in wt %) | PA66 26AE1 (in wt %) | CBT 100 (in wt %) | PA66 SHF51 (in wt %) | PPE (in wt %) | Viscosity (in Pa · s) |
|---|---|---|---|---|---|---|
| Composition 5 (according to the invention) | 90 | 0 | 0 | 10 | 0 | 22 |
| Composition 6 (according to the invention) | 95 | 0 | 0 | 5 | 0 | 28 |
| Control 2 | 0 | 100 | 0 | 0 | 0 | 500 |
| Composition 7 (not according to the invention) | 0 | 96 | 4 | 0 | 0 | 500 |
| Composition 8 (not according to the invention) | 0 | 90 | 0 | 0 | 10 | 700 |
| Composition 9 (according to the invention) | 0 | 90 | 0 | 10 | 0 | 200 |

These results clearly show that the use of a non-evolutive polymer (b) that is compatible with a polyamide (a) allows significant reduction in the viscosity of the latter.

In fact, the above table shows that the presence of 5 to 10 wt % of polyamide PA66 SHF51 makes it possible to reduce the viscosity of polyamide PA66 22FE1 or of polyamide PA66 26AE1 by about 60 to 70% (see compositions 5, 6 and 9). It should also be noted that the viscosity of these compositions comprising polyamide PA66 SHF51 remains stable even after holding in the molten state for at least 15 minutes, or even at least 30 minutes (under nitrogen), which proves absence of reaction (condensation) between the two polymers.

In contrast, adding a polymer such as the low-mass thermoplastic polymer PPE does not lower the viscosity of a polyamide of this kind (see compositions 1 to 4, 7 and 8). Plasticizer CBT100 makes it possible to lower the viscosity of the composition appreciably, but in an unstable manner (increase in the level of viscosity over time).

Example 2: Effect of the Mixing Conditions on the Behavior of the Thermoplastic Composition with Improved Fluidity Tests were carried out by mixing by extrusion with different residence times in the molten state, in order to confirm the improved fluidity of thermoplastic compositions comprising at least one mixture of polyamide of different molecular weight.

The tests were carried out using a Leistritz ZSE 18 MAAX twin-screw extruder (screw diameter 18 mm, length 44D). The conditions of material flow rate (kg/h) and rotary speed of the screws (rpm) were defined in order to obtain a residence time varying between 30 seconds and 105 seconds. An average residence time for manufacture of formulated polymer (compound) is typically of the order of 1 minute.

The polymers used are PA66 26AE2 and PA66 SHF51 (described above).

The PA66 STABAMID® 26AE2 polyamide marketed by SOLVAY, considered alone has, before extrusion, a melting point of 261° C., a melt viscosity of about 425 Pa·s (T=280° C. and 10 rad/s), and a number-average molecular weight Mn of 18255 g/mol (truncation 5000 g/mol).

The tests that were undertaken considered a single composition based on a mixture of 80% 26AE2+20% SHF51 (wt %) with different residence times RT in the range from 30 seconds to 105 seconds depending on the material flow rate Q (kg/h) and the rotary speed of the extruder n (rpm). The polymers are used in the form of granules, in the dry state (drying for 12 h, 100° C. under vacuum).

The viscosity of the compositions is measured at 280° C. using an ARES rheometer with frequency scanning from high to low frequencies. The viscosity value is obtained at 10 rad/s after vacuum drying at 110° C.

The results obtained are shown in Table 2 below.

TABLE 2

Effect of mixing conditions (thermoplastic compositions based on PA66)

| | Flow rate Q (kg/h) | Speed n (rpm) | Q/n | Residence time RT (s) | Viscosity (Pa · s) | CEG meq/kg | AEG meq/kg | VI mL/g |
|---|---|---|---|---|---|---|---|---|
| Control 1 (26AE2) | 6 | 700 | 0.009 | 45 (control) | 420 | — | — | 135 |
| Control 2 (SHF51) | 6 | 700 | 0.009 | 45 (control) | 5 | — | — | 51 |
| Test 1 | 3 | 300 | 0.01 | 105 | 175 | 73.7 | 41.8 | 116.4 |
| Test 2 | 3 | 700 | 0.004 | 90 | 177 | 72.1 | 41.5 | 114.7 |
| Test 3 | 3 | 1100 | 0.003 | 75 | 155 | 70.3 | 44.2 | 112.8 |
| Test 4 | 6 | 300 | 0.02 | 50 | 150 | 74.3 | 42.7 | 115.0 |
| Test 5 | 6 | 700 | 0.009 | 45 | 153 | 74.5 | 42.8 | 114.0 |
| Test 6 | 6 | 1100 | 0.005 | 40 | 135 | 73.3 | 44.3 | 110.5 |
| Test 7 | 9 | 300 | 0.003 | 30 | 138 | 75.4 | 42.3 | 113.6 |

TABLE 2-continued

Effect of mixing conditions (thermoplastic compositions based on PA66)

| | Flow rate Q (kg/h) | Speed n (rpm) | Q/n | Residence time RT (s) | Viscosity (Pa · s) | CEG meq/kg | AEG meq/kg | VI mL/g |
|---|---|---|---|---|---|---|---|---|
| Test 8 | 9 | 700 | 0.013 | 30 | 140 | 79.0 | 45.0 | 115.3 |
| Test 9 | 9 | 1100 | 0.008 | 30 | 200 | 75.7 | 42.3 | 112.5 |

These results show that the use of a reduced-mass non-evolutive polymer (b) with a polyamide (a) of higher mass allows a significant reduction in the viscosity of the latter; the viscosity level obtained is very slightly dependent on the residence time in the extruder.

It should be noted, moreover, that the viscosities of the composition comprising polyamide PA66 SHF51 remain stable even after holding in the molten state in the rheometer for 15 minutes (under nitrogen).

In addition, determinations of amino and acid end groups of the polyamide were carried out on the compositions obtained.

The measurement is performed by potentiometric back-determination of the amino and carboxylic end groups of the polyamide. All the functions are alkalized by adding 8 ml of 0.05N tetrabutylammonium hydroxide, followed by determination with 0.05N hydrochloric acid in methanol. The dissolution solvent is based on a mixture of 77% TFE (Solvay) and 23% chloroform (Normapur).

The potentiometric chain is validated on a control (aminocaproic acid 7470<CEG, and AEG<7650 in meq/kg). The measurements are performed on a Metrohm potentiometric setup.

The measurements carried out on the samples from tests 1 to 9 (Table 2) show that the sum of the GT is relatively stable with the residence time RT (taking into account the precision for the measurements).

Measurements of viscosity index VI (according to standard ISO 307) were also carried out: the results obtained show that the VI is relatively stable with the residence time RT (taking into account the precision of the measurements).

Example 3: Mechanical Properties of a Composition Based on a Polyamide Mixture—Fracture Toughness K1c A composition based on polyamide PA66 22FE1 (described above) and PA66 SHF51 (described above) was prepared by mixing in a twin-screw extruder: mixture 65% 22FE1+35% SHF51 (wt %).

Bars were injected using the granules obtained with the extruder, in order to obtain test specimens for mechanical testing.

A critical property with respect to the molecular weights of the polymers is resistance to cracking, called fracture toughness. In opening mode (mode I), the resistance to cracking or toughness is represented by the critical factor of stress intensity K1c (or energy G1c).

The measurements are performed according to standard ISO 13586: notching of the test specimens, then mechanical tests of the 3-point bending type in the dry state (RH=0) (drying for 12 h, 100° C. under vacuum).

The values obtained are presented in Table 3 below.

TABLE 3

Mechanical properties (thermoplastic compositions based on PA66)

| | Viscosity (Pa · s) | Modulus E (GPa) | Toughness K1c (MPa · m½) |
|---|---|---|---|
| Control 1 (22FE1) | 70 | 3.8 | 3.5 |
| Control 2 (SHF51) | 5 | 3.75 | 1.6 |
| Composition 65/35 | 20 | 3.8 | 3.5 |

These results show that although the use of a non-evolutive "low mass" polymer compatible with a "high mass" polyamide allows a significant reduction in the viscosity of the latter, it does not alter certain properties in the solid state such as the elastic modulus E or the fracture toughness (K1c, or Gc). The presence of a "low mass" polymer in a reduced proportion makes it possible to obtain a greatly improved fluidity while maintaining good mechanical performance, which is provided essentially by the "high mass" polymer. It is thus possible to obtain a good compromise between fluidity and fracture toughness (Gc).

Example 4: Wetting Behavior of a Composition Based on a Polyamide Mixture—Polymer/Class Interface A composition based on polyamide PA66 22FE1 (described above) and PA66 SHF51 (described above) was prepared by mixing in a twin-screw extruder: mixture of 70% 22FE1+30% SHF51 (wt %).

The granules obtained were dried for 12 h at 100° C. under vacuum.

The wetting in the molten state was measured for PA66 22FE1, PA66 SHF51 and the 70/30 composition. Glass plates were prepared: surface cleaning/degreasing by alcohol/acetone treatment and then activation of the surface (silanols SiOH) by treatment with $H_2O_2$ (30%)/$H_2SO_4$ (70%) solution.

The wetting of the polymer in the molten state is measured from the angle θ obtained for granules deposited on a glass plate and heated to 290° C. The measurements were obtained at temperature with a Kruss DSA100 tensiometer, under argon.

The values obtained after a stabilization time of 150 seconds are presented in Table 4 below.

TABLE 4

Wetting, hot (thermoplastic compositions based on PA66)

| | Viscosity (Pa · s) | Angle θ (°) |
|---|---|---|
| Control 1 (22FE1) | 70 | 72 |

TABLE 4-continued

Wetting, hot (thermoplastic compositions based on PA66)

| | Viscosity (Pa · s) | Angle θ (°) |
|---|---|---|
| Control 2 (SHF51) | 5 | 64 |
| Composition 70/30 | 22 | 51 |

These results show that although the use of a non-evolutive "low mass" polymer compatible with a "high mass" polyamide allows a significant reduction in the viscosity of the latter, it also gives a notable improvement of wetting with respect to a glass surface. It is thus possible to obtain interfaces of good quality with these compositions.

Example 5: Preparation of a Composite with Equilibrated Fabric (Satin)

Thermoplastic composition 5 from example 1 (Table 1) is used in this example for preparing a composite.

The reinforcing fabric used is a glass fiber fabric with satin of 8 having a weight of 500 g/m².

The thermoplastic composition in question is used in the form of powder. The powders are obtained by cryogenic grinding, either in dry ice, or in liquid nitrogen.

The composite components are produced using a Schwabenthan temperature-controlled double platen hydraulic press (Polystat 300A): heating plates (heating resistances), and cooled plates (water circulation). A metal mold with a cavity with the dimensions 150 mm×150 mm or 200 mm×300 mm is used.

To make a composite containing 60 vol % of glass fibers with the fabric with a weight of 500 g/m², a metal frame is inserted between the platens, in which a preform is placed consisting of an alternating stack comprising 6 sheets of glass cloth, powder uniformly distributed between each, the two outer layers being sheets of glass cloth.

The temperature of the platens of the press is first raised to 275° C. (in the case of PA66) before inserting the preform. At this temperature, pressure is applied between 1 and 20 bar and maintained at this value; rapid degassing may optionally be carried out. The whole is maintained at the same temperature and pressure, without degassing, for a time sufficient for good impregnation (stabilization of the pressure and of the distance between platens). The mold is then transferred to the cooled plate device and held at a pressure between 1 and 5 bar for a time of less than 5 minutes.

The cycle time is above 10 minutes for viscosities above 250 Pa·s; it is reduced to about 10 minutes for viscosities between 250 and 70 Pa·s; finally, for low viscosities (below 50 Pa·s) the cycle time is less than 5 minutes.

The composite components thus obtained have dimensions of 150 mm×150 mm or 200 mm×300 mm and a thickness of about 2 mm.

The presence of a small proportion of low mass' polymer makes it possible to obtain greatly improved fluidity while maintaining good mechanical performance, which is provided essentially by the polymer of higher mass. It is thus possible to obtain a good compromise between fluidity and fracture toughness (Gc).

Moreover, the presence of low-mass polymer gives the composition excellent hot wettability on fabric (hot fabric). This contributes to securing a good level of interfacial cohesion between the polymer and the reinforcing fibers.

The very low viscosity of the thermoplastic compositions according to the invention thus allows excellent consolidation (void percentage: 0.1%), for a volume percentage of fibers of 60% and a short cycle time (under 5 minutes).

The void percentage is measured by weighing (standard ASTM D2734-94), and optionally checked by observation with a scanning electron microscope (SEM) for low levels.

The cycle time corresponds to the total time between heating the mold to temperature and cooling under pressure.

Example 6: Preparation of a Composite with Unidirectional Woven Reinforcement

A mixture of polymer based on PA66 STABAMID 22FE1 polyamide (described above) and "low mass" PA66 SHF51 (described above) was produced using a Leistritz ZSE 18 MAAX twin-screw extruder (screw diameter 18 mm, length 44D), and conditions of material flow rate (kg/h) and rotary speed of the screws (rpm) leading to a residence time of less than 1 min. The ratio used is 70% PA66 22FE1 and 30% PA66 SHF51.

The thermoplastic composition thus obtained is used in this example for preparing a composite (stratified) plate.

The reinforcing fabric used is a glass fiber fabric of the unidirectional woven type with high modulus, consisting of roving at 0° (warp: 1200 tex), a warp spacer thread (136 tex) and a thread at 90° (weft: 70 tex) with a distance between weft thread of 5 mm, and having an overall weight of 520 g/m².

The thermoplastic composition in question is used in the form of powder. The powders are obtained by cryogenic grinding, either in dry ice, or in liquid nitrogen, and then drying (RH=0).

The composite components are produced using a Pinette Emidecau hydraulic press with temperature-controlled platens (PEI Lab 600 kN): controlled platen heating (heating resistances)/cooling (air-water circulation). A metal mold with a cavity with the dimensions 450 mm×500 mm is used.

To make a composite containing 55 vol % of glass fibers with the fabric with a weight of 500 g/m², a metal frame is inserted between the platens, in which a preform is placed consisting of an alternating stack comprising 8 plies of glass cloth, with powder uniformly distributed between each. The number of plies is adjusted so as to vary the proportion of fibers: 45, 50 and 55 vol %.

The temperature of the platens of the press is first raised to 265° C. before inserting the preform. At this temperature, pressure is applied progressively in a controlled manner between 1 and 3.5 bar and held at this value while the temperature is raised in a controlled manner to 280° C. The whole is kept at the same temperature and pressure, without degassing, for 2.5 min to ensure good impregnation (stabilization of the pressure and of the distance between platens). The assembly under pressure is then cooled at 5° C./min and then 20° C./min to a temperature of 80° C. for mold release.

The composite components thus obtained have dimensions of 500×450 mm and a thickness of about 3.4 mm.

The very low viscosity of the thermoplastic composition according to the invention makes it possible to obtain excellent consolidation (void percentage: 0.1%), for a volume percentage of fibers of 55% and a short cycle time (under 4 minutes).

For comparison (Control), composite plates were produced with the same protocol using PA66 22FE1 polymer.

The mechanical properties are measured on specimens cut from the plates, with the 0° axis corresponding to the direction of the warp rovings of the unidirectional woven fabrics HM, according to standard NF EN ISO 5274. The void percentage (density) is measured according to standard ASTM D2734-94.

The effective level of fiber was measured by calcination: it is 54 vol % for intended 55%, 48 vol % for intended 50% and 43 vol % for intended 45%.

The values obtained are presented in Table 5 below.

TABLE 5

Mechanical performance of stratified composites based on thermoplastic compositions (PA66)

| | Level of fibers: 43 vol %. | | Level of fibers: 48 vol %. | | Level of fibers: 54 vol %. | |
|---|---|---|---|---|---|---|
| | Modulus E (GPa) | Breaking stress (MPa) | Modulus E (GPa) | Breaking stress (MPa) | Modulus E (GPa) | Breaking stress (MPa) |
| Composite Control (base 22FE1) | 32.5 | 515 | 38 | 580 | 42 | 635 |
| Composite according to the invention (base Composition 70/30) | 33.5 | 620 | 39.1 | 650 | 42.9 | 705 |

These results show that the use of a non-evolutive "low mass" polymer compatible with a "high mass" polyamide makes it possible to improve the properties of stratified composites considerably relative to the use of the "high mass" polyamide alone. This gain in performance is connected with better impregnation of the reinforcement and a better interface quality.

The invention claimed is:

1. A thermoplastic composition having improved fluidity in the molten state, comprising at least:
   (a) a polyamide that has a melt viscosity greater than or equal to 50 Pa·s, and
   (b) a non-evolutive polyamide having a melt viscosity lower than the melt viscosity of said polyamide (a), above 0.8 Pa·s, and having a number-average molecular weight Mn lower than that of said polyamide (a),
   said composition having a melt viscosity that is stabilized at a value below the melt viscosity of said polyamide (a),
   said polyamide (b) having:
      a concentration of amine end groups (AEG) and/or of carboxyl end groups (CEG) less than or equal to 20 meq/kg, or
      a concentration of amine end groups (AEG) greater than or equal to 25 meq/kg; a concentration of acid end groups (CEG) greater than or equal to 25 meq/kg; and a concentration of blocked end groups (BEG) greater than or equal to 25 meq/kg,
   wherein the content of the polyamide (b) is from 5 to 20 wt % relative to the total weight of the composition, and
   wherein said polyamides (a) and (b) being selected independently of one another from the group consisting of: PA 66, PA 6.10, PA 6.12, PA 12.12, PA 4.6, PA 6, PA 7, PA 9T, PA 10T, PA 11, PA 12, PA 6T/6I, PA 6T/6I/66, copolyamides thereof, and mixtures thereof.

2. The composition as claimed in claim 1, in which the content of polyamide (b) is from 5 to 12 wt % relative to the total weight of the composition.

3. The composition as claimed in claim 1, in which polyamides (a) and (b) are structurally similar to one another, or are derived from the same polyamide, and the melting point of polyamide (b) being less than or equal to that of polyamide (a).

4. The composition as claimed in claim 1 having a melt viscosity below 50% of the melt viscosity of said polyamide (a).

5. The composition as claimed in claim 1, having a melt viscosity that increases, at most by 25%, relative to its initial value for a time of at least 15 minutes, at constant temperature and pressure under an inert atmosphere.

6. The composition as claimed in claim 1, said polyamide (b) having a melt viscosity below 50 Pa·s.

7. The composition as claimed in claim 1, in which said polyamide (b) has a concentration of amine end groups (AEG) and/or of carboxyl end groups (CEG) less than or equal to 15 meq/kg.

8. The composition as claimed in claim 1, said polyamide (b) having a number-average molecular weight Mn between 5000 and 8500 g/mol.

9. The composition as claimed in claim 1, said polyamide (a) having a melt viscosity ranging from 50 to 2000 Pa·s.

10. The composition as claimed in claim 1, said polyamide (a) having a number-average molecular weight Mn between 8000 and 40000 g/mol.

11. The composition as claimed in claim 1, in which said polyamides (a) and (b) are selected independently of one another from the polyamides resulting from the polycondensation of at least one aliphatic dicarboxylic acid with an aliphatic or cyclic diamine, the polyamides resulting from polycondensation of at least one aromatic dicarboxylic acid and an aliphatic or aromatic diamine, the polyamides obtained by polycondensation of at least one amino acid or lactam with itself, or mixtures thereof and (co)polyamides.

12. A thermoplastic composition having improved fluidity in the molten state, comprising:
   (a) a polyamide that has a melt viscosity greater than or equal to 50 Pa·s, and
   (b) a non-evolutive polyamide having a melt viscosity lower than the melt viscosity of said polyamide (a), above 0.8 Pa·s, and having a number-average molecular weight Mn lower than that of said polyamide (a),
   said composition having a melt viscosity that is stabilized at a value below the melt viscosity of said polyamide (a), said polyamide (b) having:
- a concentration of amine end groups (AEG) and/or of carboxyl end groups (CEG) less than or equal to 20 meq/kg, or
- a concentration of amine end groups (AEG) greater than or equal to 25 meq/kg; a concentration of acid end groups (CEG) greater than or equal to 25 meq/kg; and a concentration of blocked end groups (BEG) greater than or equal to 25 meq/kg, wherein said polyamides (a) and (b) comprising, independently of one another, hydroxyaromatic units bound chemically to the chain of the polyamide.

13. A method for manufacturing a composite comprising at least one step of impregnation of a reinforcing fabric with a composition as claimed in claim 1 in the molten state.

14. A composite article obtained by the method as claimed in claim 13.

* * * * *